US010956474B2

(12) United States Patent
Pasternack

(10) Patent No.: US 10,956,474 B2
(45) Date of Patent: Mar. 23, 2021

(54) DETERMINATION OF BEST SET OF SUGGESTED RESPONSES

(71) Applicant: Microsoft Technology Licensing, LLC, Redmond, WA (US)

(72) Inventor: Jeffrey William Pasternack, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/353,397

(22) Filed: Mar. 14, 2019

(65) Prior Publication Data

US 2020/0293562 A1     Sep. 17, 2020

(51) Int. Cl.
*G06F 3/0482* (2013.01)
*G06F 16/338* (2019.01)
*G06F 9/451* (2018.01)

(52) U.S. Cl.
CPC .......... *G06F 16/338* (2019.01); *G06F 3/0482* (2013.01); *G06F 9/451* (2018.02)

(58) Field of Classification Search
CPC ....... G06F 16/338; G06F 9/451; G06F 3/0482
See application file for complete search history.

(56) References Cited

U.S. PATENT DOCUMENTS

| | | | |
|---|---|---|---|
| 7,783,486 B2 | 8/2010 | Rosser et al. |
| 8,204,751 B1 | 6/2012 | Di Fabbrizio et al. |
| 9,576,050 B1 | 2/2017 | Walters et al. |
| 9,715,496 B1 | 7/2017 | Sapoznik et al. |
| 9,824,692 B1 | 11/2017 | Khoury et al. |
| 9,852,177 B1 | 12/2017 | Cheung et al. |
| 9,860,200 B1 | 1/2018 | Braun et al. |
| 9,899,020 B2 | 2/2018 | Huang |
| 10,091,140 B2 | 10/2018 | Galley et al. |
| 10,109,275 B2 | 10/2018 | Henry |
| 10,169,315 B1 | 1/2019 | Heckel et al. |
| 10,210,244 B1 | 2/2019 | Branavan et al. |
| 10,268,671 B2 | 4/2019 | Kaiser et al. |

(Continued)

OTHER PUBLICATIONS

Anjuli Kannan et al., Smart Reply: Automated Response Suggestion for Email, selected excerpts, published Jun. 2016 (Year: 2016 ).*

(Continued)

*Primary Examiner* — Jennifer N To
*Assistant Examiner* — Amy P Hoang
(74) *Attorney, Agent, or Firm* — Schwegman Lundberg & Woessner, P.A.

(57) ABSTRACT

Applications are presented for selecting response suggestions in a Graphical User Interface (GUI). Responses are identified for a message received in the GUI. Each response has a score and occupies a width of pixels in the GUI, which provides an available width of pixels for presenting the responses. Further, the method includes an operation for identifying sets of the responses, each set having one or more of the suggested responses. For each set, a utility of the set is calculated based on the score of the responses in the set, the width of pixels of the responses in the set, and the available width of pixels. Further, the set with the greatest utility is selected and then the responses of the set are presented in the GUI. Same principles may be applied to organizing screen layouts for applications that scroll vertically, such as user feeds or search results.

17 Claims, 10 Drawing Sheets

(56) References Cited

U.S. PATENT DOCUMENTS

| | | |
|---|---|---|
| 10,339,919 B1 | 7/2019 | Raux |
| 10,354,182 B2 | 7/2019 | Chang et al. |
| 10,366,341 B2 | 7/2019 | Weber et al. |
| 10,387,571 B2 | 8/2019 | Baldwin et al. |
| 10,417,266 B2 | 9/2019 | Patel et al. |
| 10,475,438 B1 | 11/2019 | Chicote et al. |
| 2007/0070979 A1 | 3/2007 | Kim et al. |
| 2013/0226562 A1 | 8/2013 | Arnon |
| 2013/0325992 A1 | 12/2013 | Mcgann et al. |
| 2015/0213372 A1 | 7/2015 | Shah et al. |
| 2016/0282956 A1 | 9/2016 | Ouyang et al. |
| 2016/0337301 A1 | 11/2016 | Rollins et al. |
| 2017/0032035 A1 | 2/2017 | Gao et al. |
| 2017/0092264 A1 | 3/2017 | Hakkani-tur et al. |
| 2017/0098153 A1 | 4/2017 | Mao et al. |
| 2017/0118336 A1 | 4/2017 | Tapuhi et al. |
| 2017/0124432 A1 | 5/2017 | Chen et al. |
| 2017/0132019 A1 | 5/2017 | Karashchuk et al. |
| 2017/0180294 A1 | 6/2017 | Milligan et al. |
| 2017/0195269 A1 | 7/2017 | Miklos et al. |
| 2017/0201471 A1 | 7/2017 | Miklos et al. |
| 2018/0018971 A1 | 1/2018 | Park et al. |
| 2018/0024991 A1 | 1/2018 | Baldwin et al. |
| 2018/0052829 A1 | 2/2018 | Lee |
| 2018/0083901 A1 | 3/2018 | Mcgregor et al. |
| 2018/0144234 A1 | 5/2018 | Devesa |
| 2018/0144248 A1 | 5/2018 | Lu et al. |
| 2018/0157664 A1 | 6/2018 | Howell et al. |
| 2018/0157992 A1 | 6/2018 | Susskind et al. |
| 2018/0189271 A1 | 7/2018 | Noh et al. |
| 2018/0189559 A1 | 7/2018 | Lee et al. |
| 2018/0210874 A1* | 7/2018 | Fuxman ................. G06F 40/35 |
| 2018/0218382 A1 | 8/2018 | Ye et al. |
| 2018/0239770 A1* | 8/2018 | Ghotbi ................. G06F 3/0484 |
| 2018/0268317 A1 | 9/2018 | Dharwadker et al. |
| 2018/0285459 A1 | 10/2018 | Soni et al. |
| 2018/0329982 A1* | 11/2018 | Patel ....................... G06F 40/35 |
| 2018/0336193 A1 | 11/2018 | Liu et al. |
| 2018/0341839 A1 | 11/2018 | Malak et al. |
| 2018/0367480 A1 | 12/2018 | Housman |
| 2018/0367484 A1 | 12/2018 | Rodriguez et al. |
| 2019/0012374 A1 | 1/2019 | Petroni et al. |
| 2019/0042748 A1 | 2/2019 | Shabtai et al. |
| 2019/0073351 A1 | 3/2019 | Zhang et al. |
| 2019/0073580 A1 | 3/2019 | Dzhulgakov et al. |
| 2019/0114362 A1 | 4/2019 | Subbian et al. |
| 2019/0124019 A1 | 4/2019 | Leon et al. |
| 2019/0129947 A1 | 5/2019 | Shin |
| 2019/0130249 A1 | 5/2019 | Bradbury et al. |
| 2019/0220513 A1 | 7/2019 | Xin |
| 2019/0251165 A1 | 8/2019 | Bachrach et al. |
| 2019/0258854 A1 | 8/2019 | Hosabettu et al. |
| 2019/0266482 A1 | 8/2019 | Erez |
| 2019/0286943 A1 | 9/2019 | Leskovec et al. |
| 2019/0325293 A1 | 10/2019 | Wang et al. |
| 2019/0333020 A1 | 10/2019 | Zhao et al. |
| 2019/0333400 A1 | 10/2019 | Saini et al. |
| 2019/0341021 A1 | 11/2019 | Shang et al. |
| 2020/0044990 A1 | 2/2020 | Zhao et al. |

OTHER PUBLICATIONS

"Apply word embeddings to entire document to get a feature vector", Retrieved from https://stats.stackexchange.com/questions/221715/apply-word-embeddings-to-entire-document-to-get-a-feature-vector, Oct. 2016, 4 Pages.

"Non Final Office Action Issued in U.S. Appl. No. 16/051,050", dated Nov. 21, 2019, 41 Pages.

Brownlee, Jason, "What Are Word Embeddings for Text?", in Machine Learning Mastery, Oct. 11, 2017, 11 Pages.

Chollet, Francois, "A ten minute introduction to sequence to sequence learning in Keras", in the Keras Blog, Sep. 29, 2017, 8 Pages.

Lenz, et al., "Why are word embedding actually vectors?", Retrieved from https://stackoverflow.com/questions/46724680/why-are-word-embedding-actually-vectors, Oct. 2017, 8 Pages.

Zia, et al., "What is embedding in deep neural architectures", Retrieved from https://www.quora.com/What-is-embedding-embedded-space-feature-embedding-in-deep-neural-architectures, Dec. 2016, 3 Pages.

* cited by examiner

US 10,956,474 B2

DETERMINATION OF BEST SET OF SUGGESTED RESPONSES

RELATED APPLICATIONS

This application is related by subject matter to U.S. patent application Ser. No. 16/051,050, filed Jul. 31, 2018, and entitled "Sequence to Sequence to Classification Model for Generating Recommended Messages," and U.S. patent application Ser. No. 16/231,199, filed Dec. 21, 2018, and entitled "Generating Recommended Responses Based on Historical Message Data," all of which are incorporated herein by reference in their entirety.

TECHNICAL FIELD

The subject matter disclosed herein generally relates to methods, systems, and machine-readable storage media for creating versatile, fast, and easy-to-use computer user interfaces.

BACKGROUND

Digital messaging is quickly becoming the most common way to communicate with friends and colleagues. For example, messaging applications are commonly used to send and receive messages between individual users and groups of users. While these messaging applications are useful, they still require users to take the time to type responses.

People may be busy and do not always have time to craft these responses. There are current systems that provide users with suggested responses. However, these systems have limitations. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
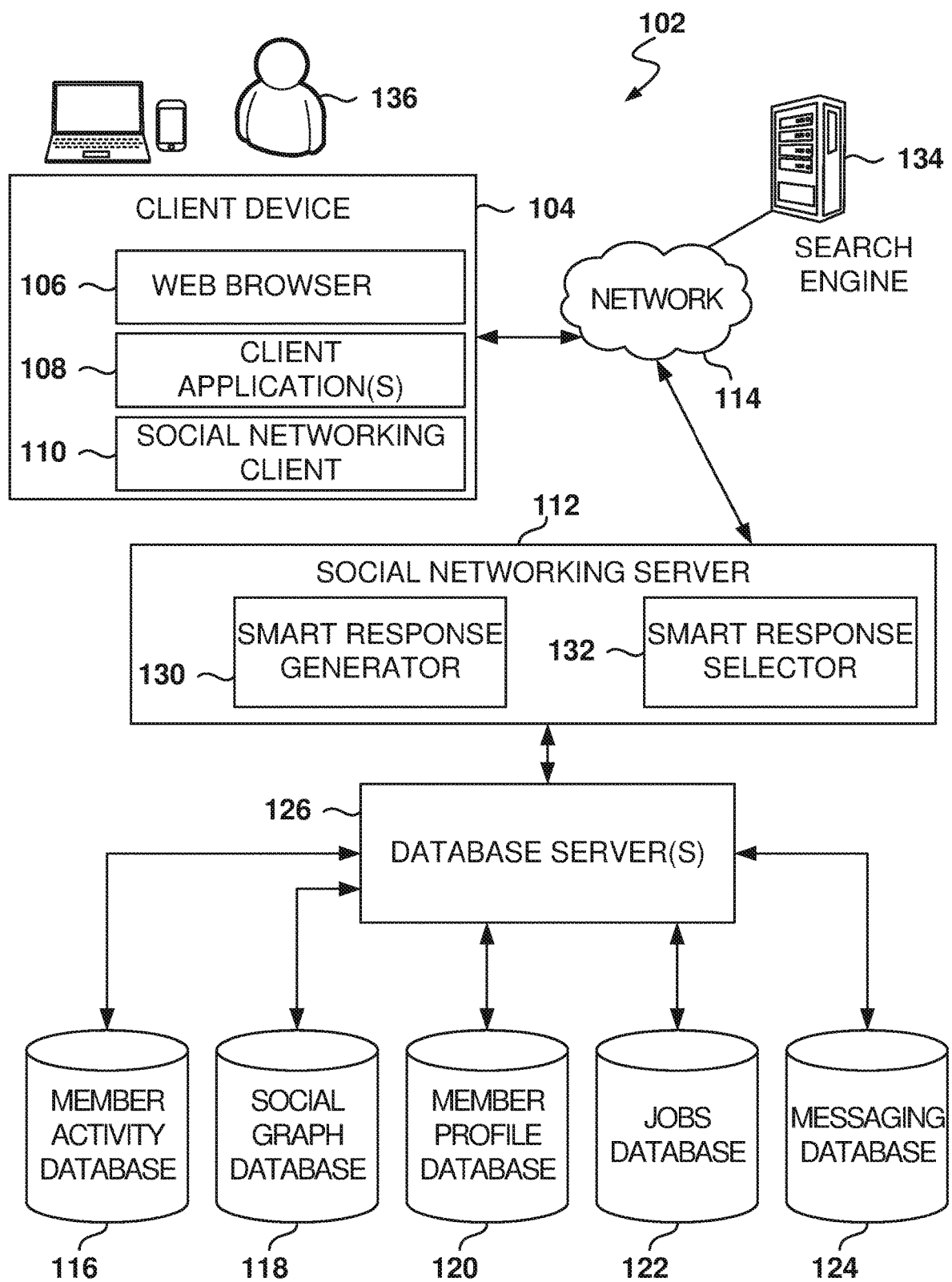
FIG. 1 is a block diagram illustrating a networked system, according to some example embodiments.

Example methods, systems, and computer programs are directed to selecting response suggestions, in a messaging Graphical User Interface (GUI), that provide maximum utility for the user. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A messaging system may provide suggested responses in a messaging application, but oftentimes the amount of space on the display, for presenting a few suggested responses, is limited, especially in the case of messaging using mobile devices. Because of the lack of space, the system has to limit the suggestions that may be presented based on a received message. For example, the response suggestion with the highest value may be very long, which would mean omitting other valuable, but shorter, response suggestions. Traditional methods select responses based on the probability of being chosen by the user. However, this may not provide the maximum utility, also referred to herein as value, to the user.

Embodiments are presented for choosing which suggested response to display given the constraints of the interface and the value of each candidate response. The candidate response suggestions are optimized based on the constraints for space available on the display and the intrinsic value of each suggested response. The system optimizes the suggestion responses based on the constraints and the value of each response utilizing linear programming or dynamic programming.

Further, the same principles may be utilized to optimize the items presented on a user feed based on the value of each of the items for the feed and amount of space available on the display. Additionally, the same principles may be utilized when presenting a plurality of pictures that may be scrolled for selection and display.

One general aspect includes a method that includes an operation for identifying suggested responses for a message received by a user in a messaging graphical user interface (GUI). Each response has a score and occupies a width of pixels when presented in the messaging GUI, and the messaging GUI provides an available width of pixels for presenting one or more of the suggested responses. A plurality of sets of the suggested responses are identified, where each set of the suggested responses includes one or more of the suggested responses. For each set of the suggested responses, a utility of the set of the suggested responses is calculated based on the score of the suggested responses in the set, the width of pixels of the suggested responses, and the available width of pixels. Further, the method includes operations for selecting the set of the suggested responses with a greatest utility and causing presentation of the responses of the selected set of the suggested responses in the messaging GUI.

FIG. 1 is a block diagram illustrating a networked system, according to some example embodiments, including a social networking server 112, illustrating an example embodiment of a high-level client-server-based network architecture 102. Embodiments are presented with reference to an Internet service, but the principles used herein may be used for any online service accessed by members, such as a social networking service.

The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a member 136 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, Global Positioning System (GPS) devices, and so forth.

In one embodiment, the social networking server 112 is a network-based appliance that responds to initialization requests or search queries from the client device 104. One or more members 136 may be a person, a machine, or other means of interacting with the client device 104. In various embodiments, the member 136 is not part of the network architecture 102 but may interact with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. in some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a member 136, to identify or locate other connected members 136, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database servers 126 and databases 116-124. In one example embodiment, the social networking server 112 is communicatively coupled to a member activity database 116, a social graph database 118, a member profile database 120, a jobs database 122, and a messaging database 124. The databases 116-124 may be implemented as one or more types of databases including, but not limited to, a hierarchical database, a relational database, an object-oriented database, one or more flat files, or combinations thereof.

The member profile database 120 stores member profile information about members 136 who have registered with the social networking server 112. With regard to the member profile database 120, the member 136 may include an individual person or an organization, such as a company, a corporation, a nonprofit organization, an educational institution, or other such organizations.

In some example embodiments, when a member 136 initially registers to become a member 136 of the social networking service provided by the social networking server 112, the member 136 is prompted to provide some personal information, such as name, age (e.g., birth date), gender, interests, contact information, home town, address, spouse's and/or family members' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120.

As members 136 interact with the social networking service provided by the social networking server 112, the social networking server 112 is configured to monitor these interactions. Examples of interactions include, but are not limited to, commenting on posts entered by other members 136, viewing member profiles, editing or viewing a member 136's own profile, sharing content outside of the social networking service (e.g., an article provided by an entity other than the social networking server 112), updating a current status, posting content for other members 136 to view and comment on, posting job suggestions for the members 136, searching job postings, and other such interactions. In one embodiment, records of these interactions are stored in the member activity database 116, which associates interactions made by a member 136 with his or her member profile stored in the member profile database 120. The messaging database 124 stores messages exchanged among users.

The jobs database 122 includes information about job postings that may be presented by the social networking server. While the database server(s) 126 are illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

The social networking server 112 includes, among other modules, smart response generator 130 and a smart response selector 132. More details regarding the functionality of these modules are provided below. Each of the modules may be implemented in software, hardware, or any combination of software and hardware.

The network architecture 102 may also include a search engine 134. Although only one search engine 134 is depicted, the network architecture 102 may include multiple search engines 134. Thus, the social networking server 112 may retrieve search results (and, potentially, other data)

from multiple search engines 134. The search engine 134 may be a third-party search engine.

Figure 2:
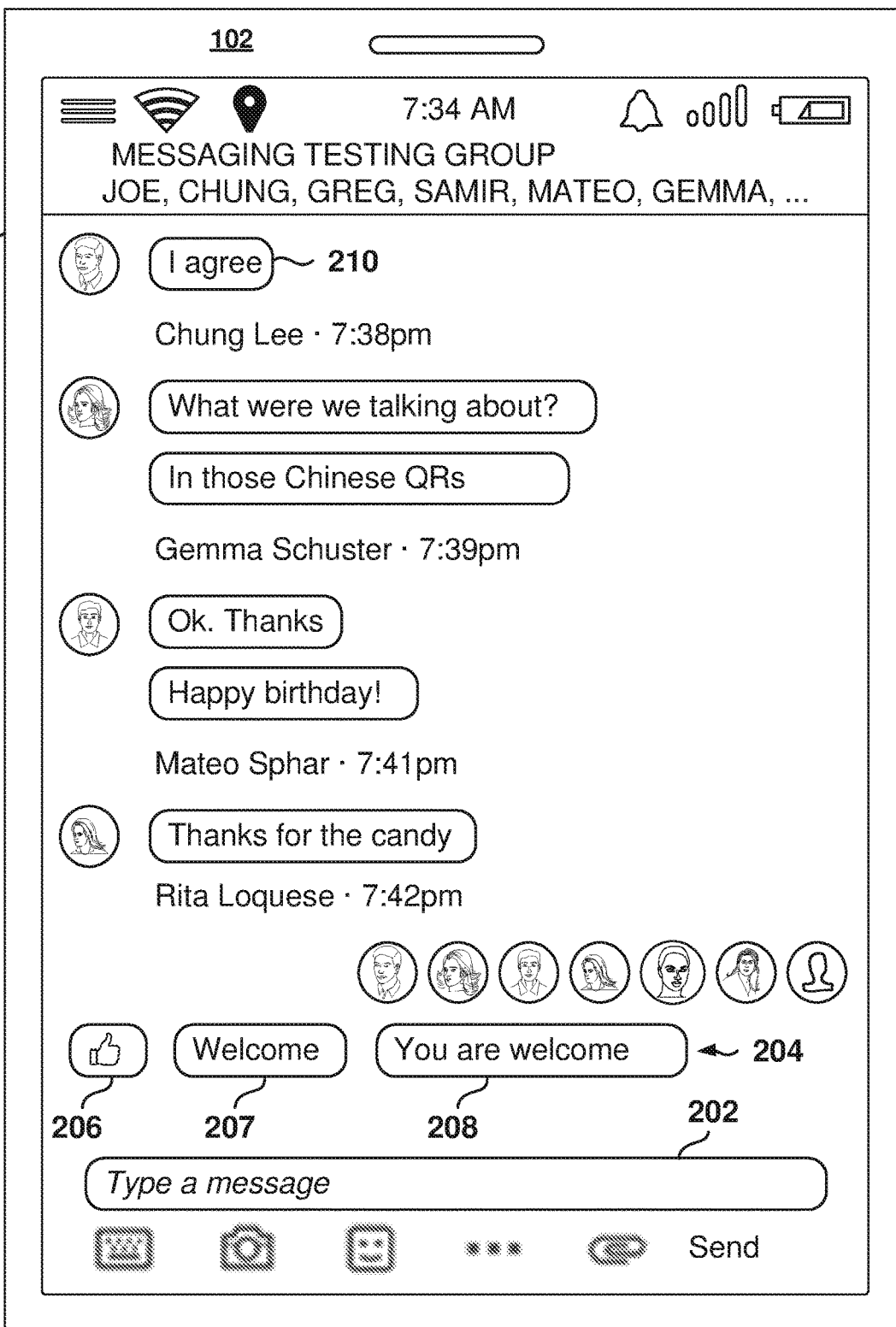
FIG. 2 is a screenshot of a messaging interface including a set of recommended response messages, according to some example embodiments.

FIG. 2 is a screenshot of a messaging interface 200 including a set of recommended response messages 204, according to some example embodiments. As shown, the messaging interface 200 shows a history of messages (e.g., message 210) transmitted between multiple users as part of a communication session. In this example, the most recent message received as part of the communication session is the phrase "Thanks for the candy."

The messaging interface includes a text field 202, which a user can utilize to type a new message, such as "you're welcome." The messaging interface also includes a set of three recommended responses 204, which a user can select as a response and that will be entered in the messaging interface as if the user had typed or had selected an icon. As shown, the recommended responses 204 include a thumbs-up emoticon 206, a "Welcome" message 207, and a "You are welcome" message 204. Although three recommended messages are shown, other embodiments may include fewer or more recommendations. Rather than use the text field 202 to manually type out a response, the user can select one of the recommended responses 204 with a single input to respond to the message.

Figure 3:
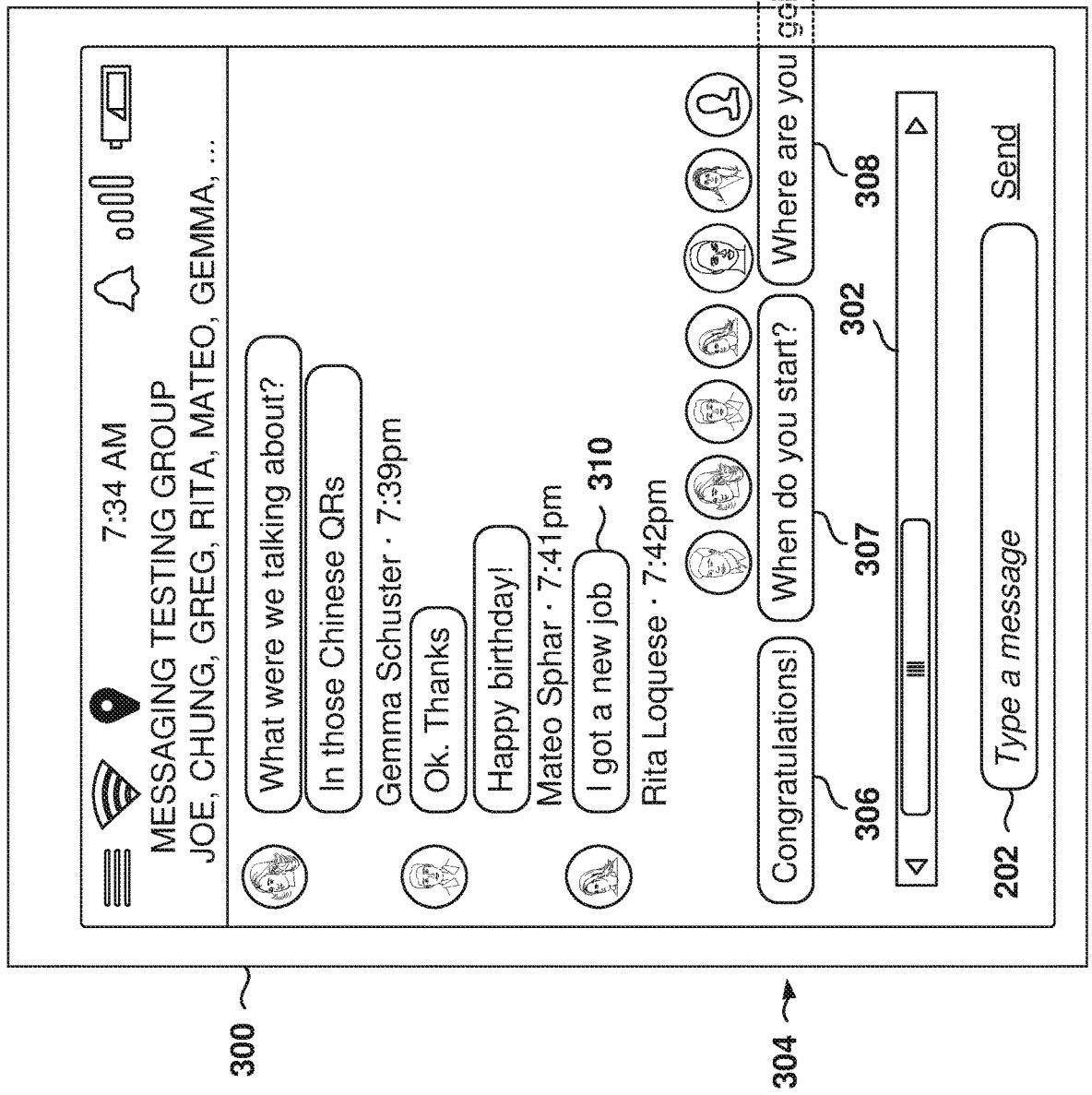
FIG. 3 illustrates a set of recommended response messages that overflow the available area on the display, according to some example embodiments.

FIG. 3 illustrates a set of recommended responses 304 that overflow the available area on a display 300, according to some example embodiments. In the example of FIG. 3, the last received message 310 is, "I got a new job."

The system has identified recommended responses 304 that include "Congratulations!" 306, "When do you start?" 307, "Where are you going to work" 308, and "What's the job?" 309. Because there is not enough space on the display 300 to present all the recommended responses 304 on the same line, not all the recommended responses 304 may be presented at the same time.

In this example, four recommended responses 304 have been selected, but in other cases, a different number of recommended responses 304 may be suggested, such as one, two, five, etc. For example, a very long response may be selected as the only recommendation.

A scroll bar 302 allows the user to scroll to the right and see the complete message (e.g., response 308) and the hidden message (e.g., response 309). However, using the scroll bar 302 may be distracting and overloads the user interface, so the system may select a different number of responses to avoid showing the scrollbar 302. But in some cases, the value of the responses overflowing the display 300 may be high, so the scrollbar 302 may be included.

Embodiments presented below calculate the optimum set of suggested responses that provide the highest value to the user, accounting for the amount of space available on the display 300, the amount of space used by each suggested response 304, and the possibility of having overflow.

Figure 4:
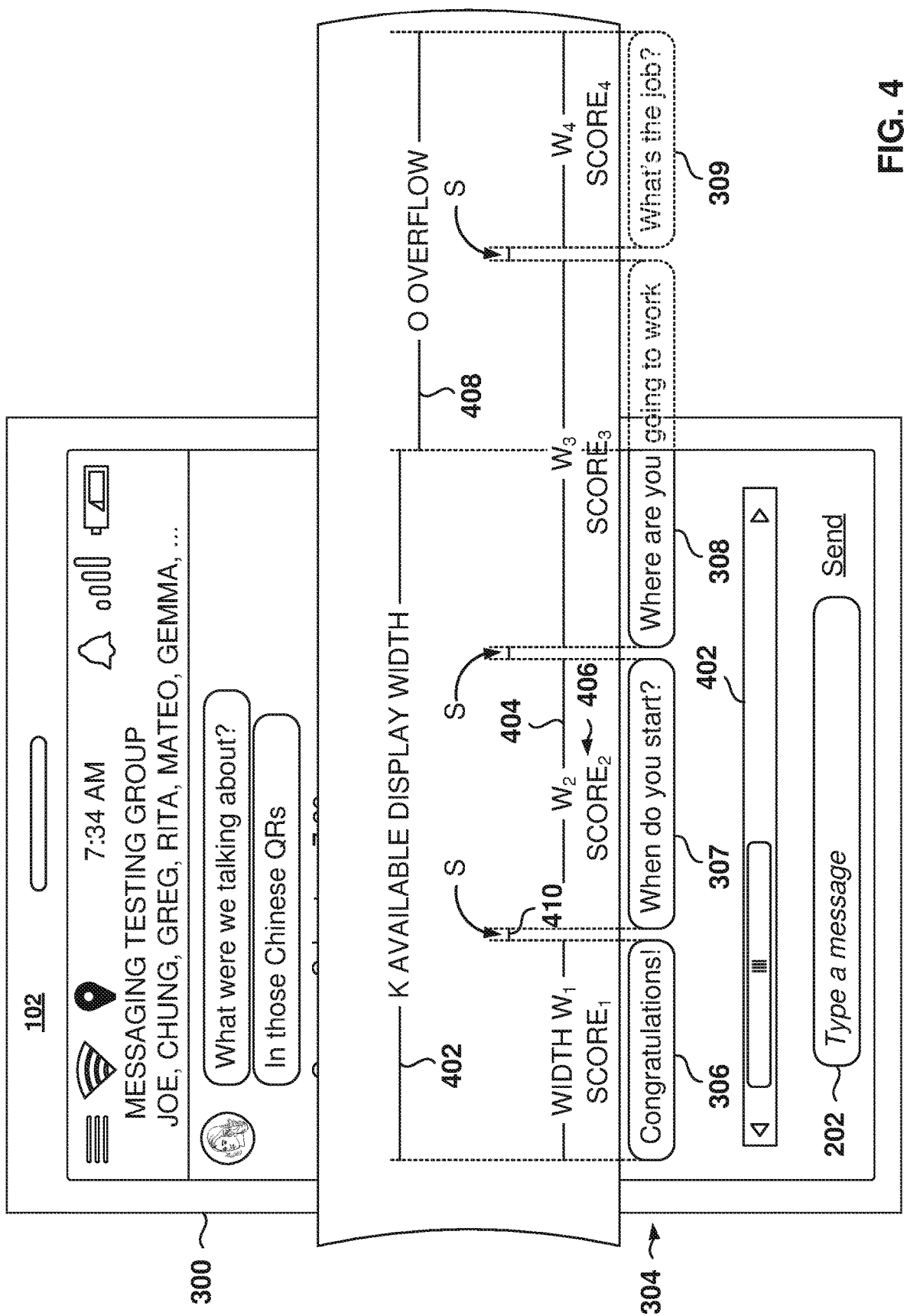
FIG. 4 illustrates the spacing of the recommended response messages, according to some example embodiments.

FIG. 4 illustrates the spacing of the recommended response messages, according to some example embodiments. K 402 is the available width of the screen in pixels. In the example of FIG. 4, there is a margin on the left of the first suggested message 306, and K does not occupy the whole width of the display 300, but in other embodiments K may cover the whole width of the display 300. Further yet, in other example embodiments, there may be a right margin, so the available space on the display 300 does not reach all the way to the right edge of the display 300.

Further, each suggested response 304 has a width $W_i$ 404 measured in pixels and a score, also referred to as value, $V_i$ 406. In some example embodiments, $V_i$ is a number, where the higher the number, the higher the utility of the suggested response to the user. In some example embodiments, $V_i$ represents the probability that the user selects the corresponding suggested response, but other embodiments may utilize other types of scores based on the value provided by the response to the user.

Further, there is a space S 410 that indicates the number of horizontal pixels between the suggested responses 304. The amount of overflow o is a non-negative number that indicates the number of pixels occupied by the suggested responses 304 outside the display area. For example, if presenting all the suggested responses 304 would require 300 additional pixels, the overflow o would be 300.

In some example embodiments, it is desired to have a set of suggested responses 304 that fits within the available width K 402 of the display 300. If there is an overflow, then a penalty is assigned because of the overflow when calculating the total value of the suggested responses 304. This means that a suggested reply that overflows the display 300 may be included if the benefit of the overflowing suggested reply is greater than the penalty.

In some example embodiments, the penalty, also referred to as cost, of the overflow a depends on the number of pixels that overflow. For example, the penalty is calculated as a tunable parameter times the number of pixels that overflow. In other example embodiments, the penalty may be one of two values: zero when there is no overflow and a constant when there is any overflow. Further yet, in other example embodiments, the penalty may be calculated based on the number of suggested responses 304 that are included, totally or in part, within the overflow space (e.g., the number of overflowing suggested messages times a tunable parameter). Further, if no overflow is desired at all, the penalty for overflow may be set to a very high number or infinity.

Further, R is a candidate set of suggested responses 304 and context refers to the context associated with the messaging interface. For example, the context may refer to the meaning of the last received message, or to the last three received messages. Thus, the context influences the value of the suggested responses that might be presented to the user. The utility provided by the suggested responses in R is referred to as U(R context). The penalty for overflow of set R is referred to as cost(o,R).

The number of spacers between the suggested responses is S times the number of suggested responses minus one when there is more than one suggested response, and for one suggested response a single spacer is considered. Thus, the number of spacers may be expressed as max(0, |R|−1), where |R| is the number of suggested responses in R. The max( ) operation accounts for the case of an empty set of suggested responses to avoid a negative number of spacers.

In one embodiment, the goal is to maximize the probability P(R|context) that the user's desired response is in R. This goal may be stated as follows:

$$\underset{R}{\mathrm{argmax}}(P(R \mid \mathrm{context}) - \mathrm{cost}(o, R)) \qquad (1)$$

The arguments of the maxima, referred to as "arg max" or "argmax," are the points of the domain of some function at which the function values are maximized. In contrast to global maxima, referring to the largest outputs of a function, argmax refers to the inputs, or arguments, at which the function outputs are as large as possible. This goal is subject to the constraint that the space taken by the suggested responses, plus the spaces between them, is less than or equal to available display width K plus the overflow o. This constraint may be expressed as follows:

$$\text{such that: } \Sigma_{r \in R} W_r + \max(0, |R|-1(S \le K+o \quad (2)$$

$$\text{and } o \ge 0 \quad (3)$$

In some example embodiments, instead of calculating P(R|context), the utility of the suggested responses is used, which may be calculated as the sum of the $V_i$'s for the responses in R, that is $\Sigma_{r \in R}\text{Score}(r,\text{context})$. The utility of the set R, U(R|context) is then calculated as the sum of the $V_i$ minus a penalty if there is overflow. Then, U(R|context) may be calculated as follows:

$$U(R|\text{context}) = \Sigma_{r \in R} \text{Score}(r,\text{context}) - \text{cost}(o,R) \quad (4)$$

In this case, the goal is to maximize the utility U(R|context) of the set R, and this goal is expressed as:

$$\operatorname*{argmax}_{R} \left( \sum_{r \in R} \text{Score}(r, \text{context}) - \text{cost}(o, R) \right) \quad (5)$$

Further, the overflow o, in pixels, may be calculated as follows:

$$o = \max(0, \Sigma_{r \in R} W_r - K + (|R|-1) \times S) \quad (6)$$

Then, equation (5) may be expressed as follows:

$$\operatorname*{argmax}_{R} \left( \sum_{r \in R} \text{Score}(r, \text{context}) - \text{cost}\left( \max\left(0, \sum_{r \in R} W_r - K + (|R|-1) \times S\right), R \right) \right) \quad (7)$$

Equations (2) and (3) may still be used as the constraints for the optimization described in equation (6).

In one example, such as the one illustrated in FIG. 3, the Scores(r) for the responses are 0.7, 0.6, 0.5, and 0.5, and their widths are 210, 250, 360, and 200 pixels. Further, K is 700 pixels and S is 10 pixels. Therefore, o is equal to 210+10+250+10+360+10+200−700, which is 350 pixels. In this example, the cost(o) is calculated as 0.003×o, or 1.05. Therefore, the total utility of this set of suggested responses is equal to 07+0.6+0.5+0.5−1.05, or 1.25. It is noted that if there were no overflow, such as by using only the first two suggested responses, the utility would be higher at 1.3. However, the cost penalty may vary in other embodiments, and if the cost penalty is lower, then there would be more utility to include three or four suggested responses.

This problem is somewhat similar to the one-dimensional knapsack problem, which can be solved by dynamic programming (assuming cost is linear in o), linear programming (e.g., mixed integer linear programming), or mixed integer quadratic programming. The knapsack problem, also referred to as the rucksack problem, is a problem in combinatorial optimization to select items, each item having a weight and a value. The goal is to determine the number of each item to include in a collection so that the total weight is less than or equal to a given limit and the total value is as large as possible. It derives its name from the problem faced by someone who is constrained by a fixed-size knapsack and must fill it with the most valuable items.

Dynamic programming refers to a mathematical optimization method and also to a computer programming method. The method is used in numerous fields, from aerospace engineering to economics. Dynamic programming involves simplifying a complicated problem by breaking it down into simpler sub-problems in a recursive manner. While some decision problems cannot be taken apart this way, decisions that span several points in time do often break apart recursively. In computer science, if a problem can be solved optimally by breaking it into sub-problems and then recursively finding the optimal solutions to the sub-problems, then it is said to have optimal substructure.

Linear programming, also referred to as linear optimization, is a method to achieve the best outcome (such as maximum profit or lowest cost) in a mathematical model whose requirements are represented by linear relationships. Further, linear programming is a technique for optimizing a linear objective function, subject to linear equality and linear inequality constraints.

If all of the unknown variables of linear programming are required to be integers, then the problem is called an integer programming or integer linear programming problem. Mixed integer linear programming involves problems in which only some of the variables are constrained to be integers, while other variables are allowed to be non-integers. Advanced algorithms for solving integer linear programs include the methods of cutting-plane, branch and bound, branch and cut, and branch and price.

This approach has the benefit that it is possible to obtain the optimal set of responses given the available space, rather than trying to guess fixed suggestion limits or use greedy approaches (e.g., take a few of the top suggested responses that will fit in the window). Further, it is possible to optimize for the case where there is a value in having overflow suggested responses if these suggested responses provide high value to the user.

Figure 5:
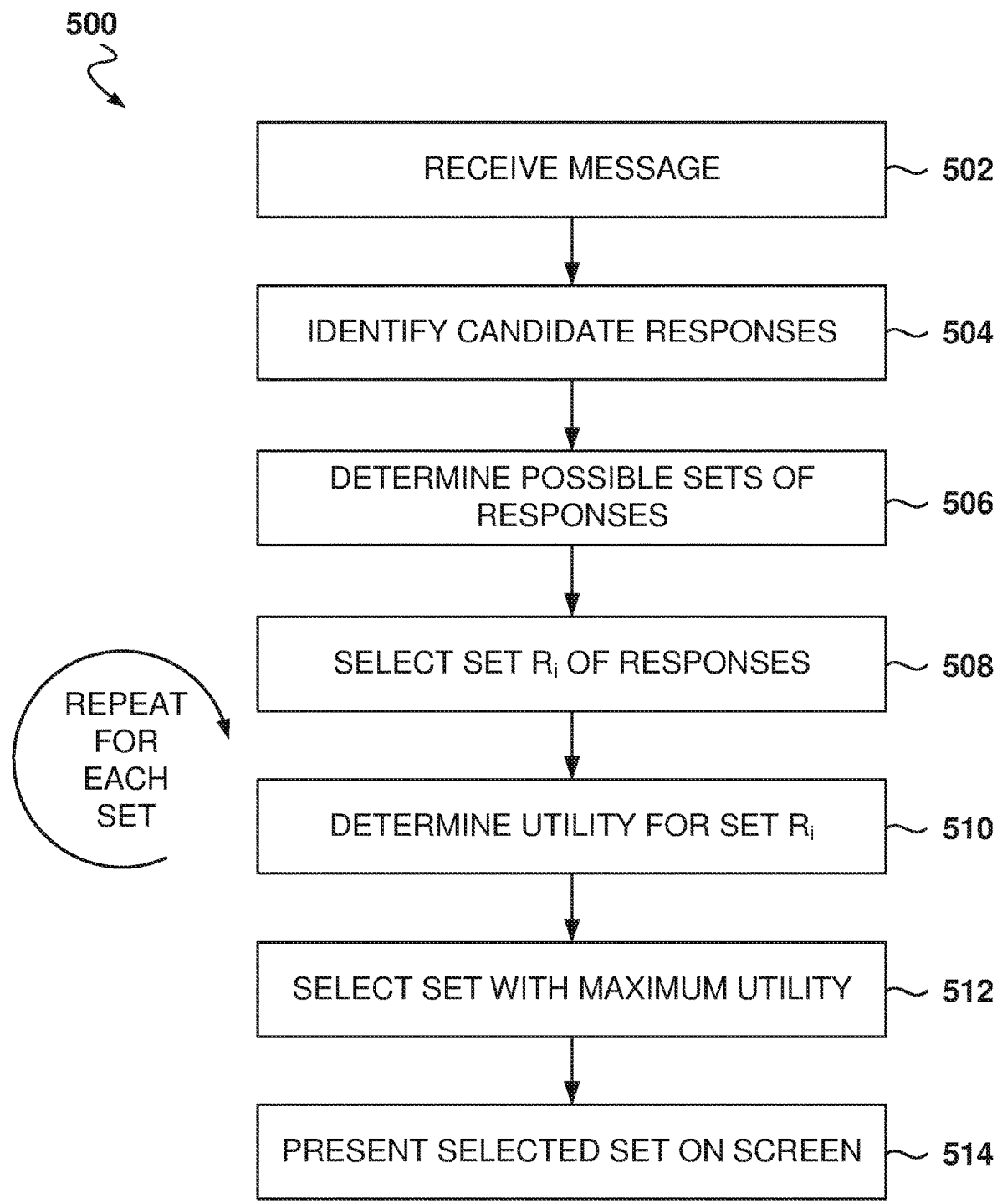
FIG. 5 is a flowchart of a method for selecting the set of responses that maximizes utility, according to some example embodiments.

FIG. 5 is a flowchart of a method 500 for selecting the set of responses that maximizes utility, according to some example embodiments. While the various operations in this flowchart are presented and described sequentially, one of ordinary skill will appreciate that some or all of the operations may be executed in a different order, be combined or omitted, or be executed in parallel.

At operation 502, a message is received in a communications application, such as texting, messaging, email, etc. From operation 502, the method 500 flows to operation 504, where candidate responses to reply to the received message are identified.

At operation 506, possible sets of responses are determined, where each set includes one or more responses that may be presented to the user so the user can select one of the responses for responding to the received message. In some implementations, between 50 and 100 sets are identified, but it is possible to have as much as 15,000 possible sets or more. Operations 508 and 510 are then performed for each of the sets.

At operation 508, one of the sets $R_i$ of responses is selected, and at operation 510, the utility U(Ri|context) of the set $R_i$ is determined. For example, U(Ri|context) is calculated using equation (4).

At operation 512, the set with the maximum U(Ri|context) is selected, and, at operation 514, the selected set is presented on the screen.

It is noted that operations 506, 508, 510, and 512 may be performed utilizing dynamic programming or linear programming, as described above, to find the set with the maximum utility.

Figure 6:
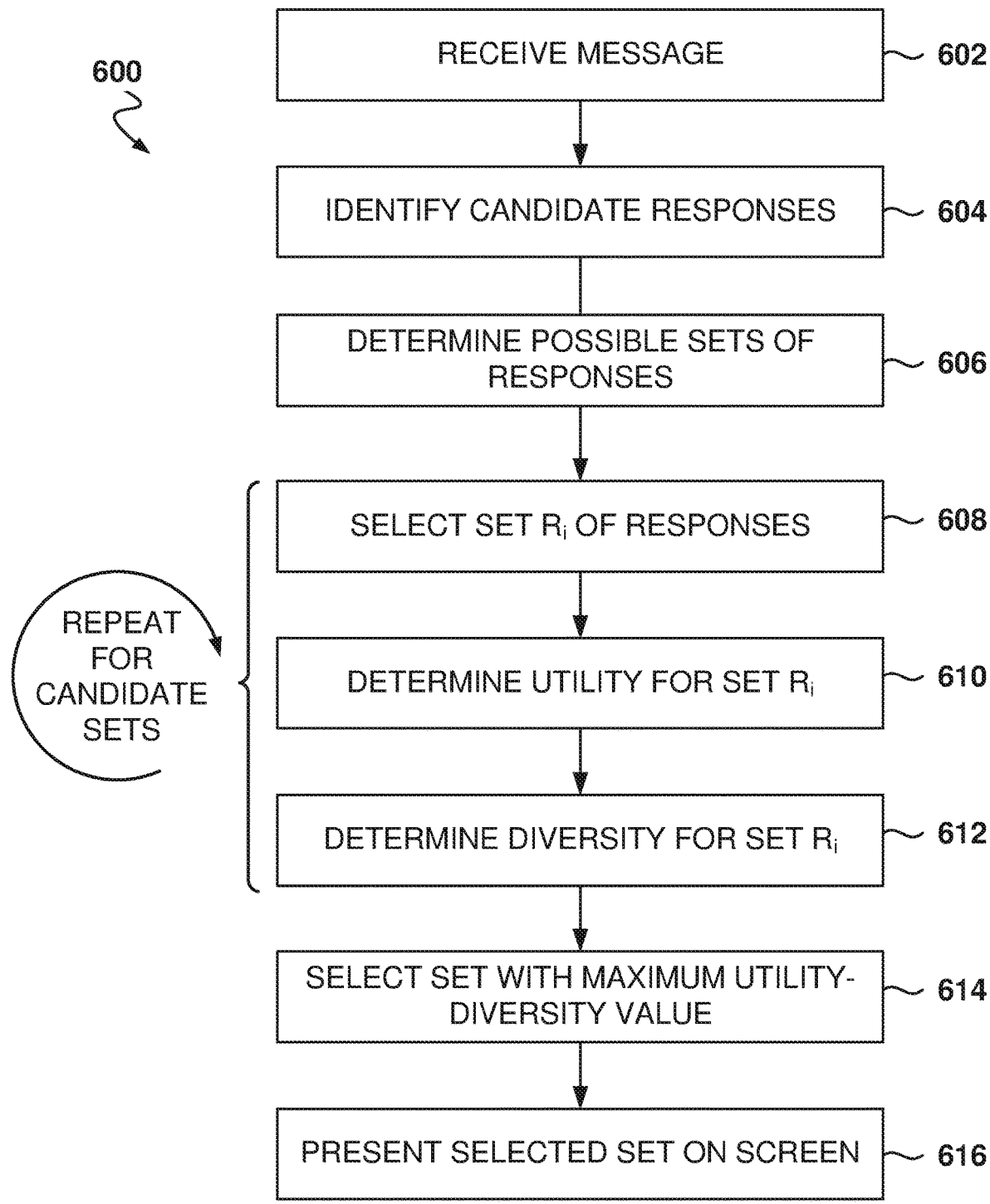
FIG. 6 is a flowchart of a method for selecting the set of responses that maximizes utility when considering the diversity of the responses, according to some example embodiments.

FIG. 6 is a flowchart of a method 600 for selecting the set of responses that maximizes utility when considering the diversity of the responses, according to some example embodiments. in general, a set is more valuable if it provides more options to the user. A set with the answers "Thank you," "Thanks," "Thank you very much," and "Tx," has answers that have a very similar meaning.

However, a set with responses of "Thank you," "I love you," "See you later," and "I owe you one," will generally be more valuable to the user because the user may express more ideas than the set with just different ways to say thanks.

In some example embodiments, the diversity of the suggested responses in a set is calculated and used together with the utility of the set to select the best option.

Operations 602, 604, and 606 are the same as operations 502, 504, and 506 of FIG. 5. Operations 608, 610, and 612 are then performed for each candidate set $R_i$. Operations 608 and 610 are the same as operations 508 and 510 of FIG. 5.

At operation 612, the diversity for the set $R_i$ is determined. In some example embodiments, the diversity is calculated based on the number of different meanings provided by the suggested responses in the set.

At operation 614, the set with the maximum utility-diversity value is selected. The utility-diversity value is calculated based on the utility of the set and the diversity of the set, such as by adding both values, each value multiplied by a respective coefficient. At operation 616, the selected set is presented on the screen.

Figure 7:
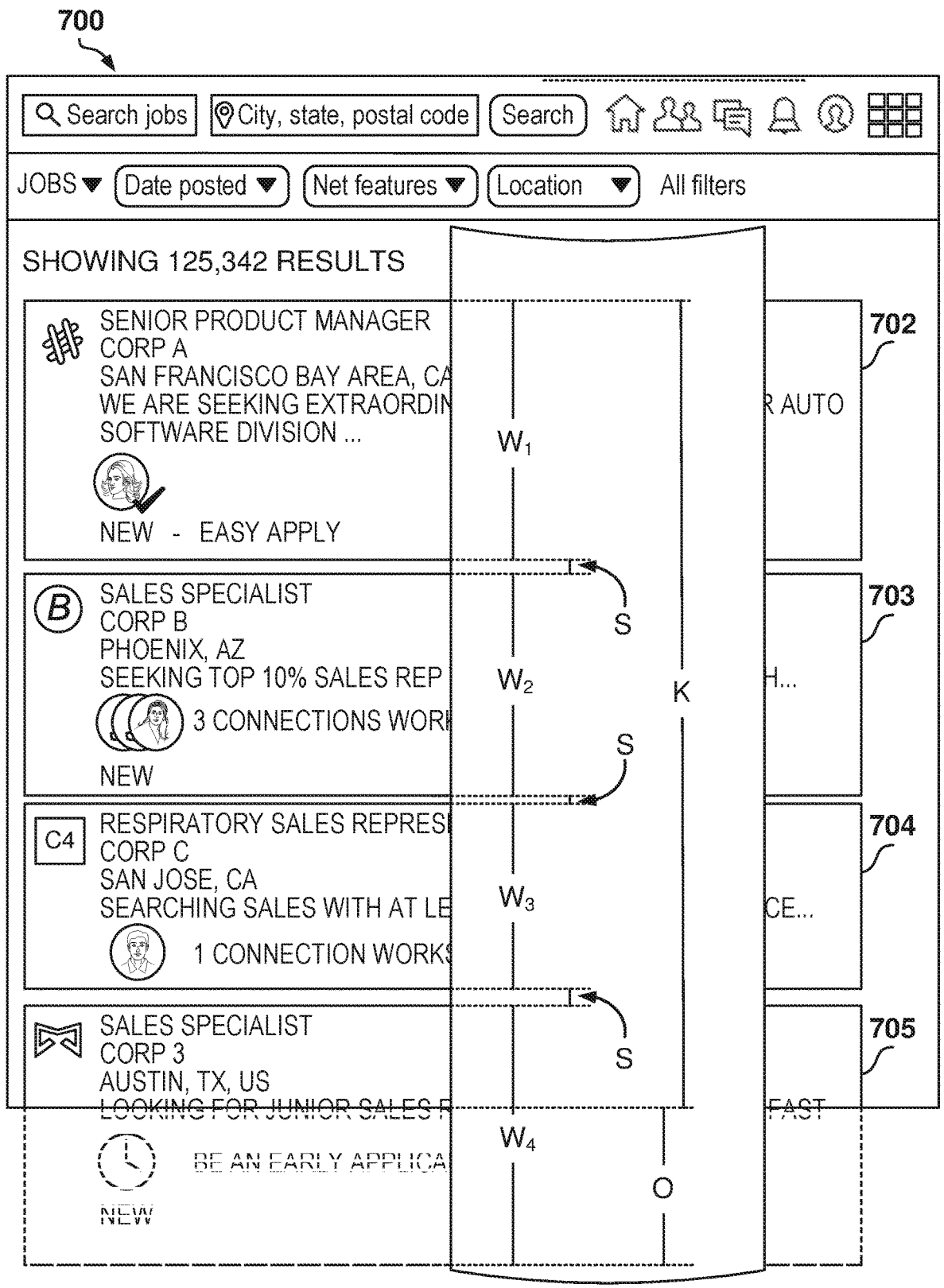
FIG. 7 is a screenshot of a user interface that includes job postings, according to some example embodiments.

FIG. 7 is a screenshot of a user interface 700 that includes job postings 702-705, according to some example embodiments. The principles presented above are described for selecting pieces of information that are presented next to each other horizontally on a display. The same principles may be utilized for selecting pieces of information that are presented next to each other vertically on a display.

For example, scenarios where items are presented sequentially, vertically on a display include email, a user feed on a social network, presenting search results, presenting job results, presented images on a photo-viewing application, etc.

In some example embodiments, the member 136 may enter a query to search for jobs and the results of the query are shown in the user interface 700. In other example embodiments, the online service provides job recommendations based on the profile and activities of the member 136. Although some embodiments are presented with reference to responses to job-search queries, the same principles may be applied to other scenarios where job postings 702-705 are presented to the member 136 (e.g., jobs sponsored by recruiters).

As the member 136 scrolls down the user interface 700, more job posting recommendations are presented to the member 136. In some example embodiments, the job posting recommendations are prioritized to present job postings in an estimated order of interest to the member 136 based on the utility of each job posting.

Job postings that are presented on the display after the search have more visibility that other job postings presented below, where the user has to scroll to see those job postings. Therefore, to maximize the utility for the user, the job-posting application may select job postings based on the utility of each job posting and how much space the job postings take. Some job postings may take a small amount of space, while other job postings may be longer.

Each of the job postings has the corresponding W indicating that vertical size in pixels and a respective value $V_i$. In some example embodiments, there is also a space S between the job postings. In other example embodiments, there may be no space between job postings and S is equal to zero. In this case, K, the available space on the display, refers to the vertical space expressed in pixels.

After the job search is performed, a plurality of candidate job postings are identified that may be presented to the user based on the search query. Once the candidate job postings are identified, the same principles may be utilized, as discussed above with reference to FIGS. 5 and 6, to select the order of the job postings presented on the top of the display.

Further, it is possible to combine the logic to manage vertical space and horizontal space in some applications. For example, a user feed on the social network may include a plurality of user entries, and one of the entries may include a plurality of pictures shown in a reduced (e.g., small) form factor. When the user selects one of the pictures in the small form factor, a bigger version of the picture is presented. The user has the option of scrolling horizontally through the pictures, but only one or a few of the pictures may be shown on the user feed.

Thus, vertical display management may be utilized to select the order of items for the user feed while horizontal display management may be applied for selecting the reduced-size version of pictures presented on the user feed.

Figure 8:
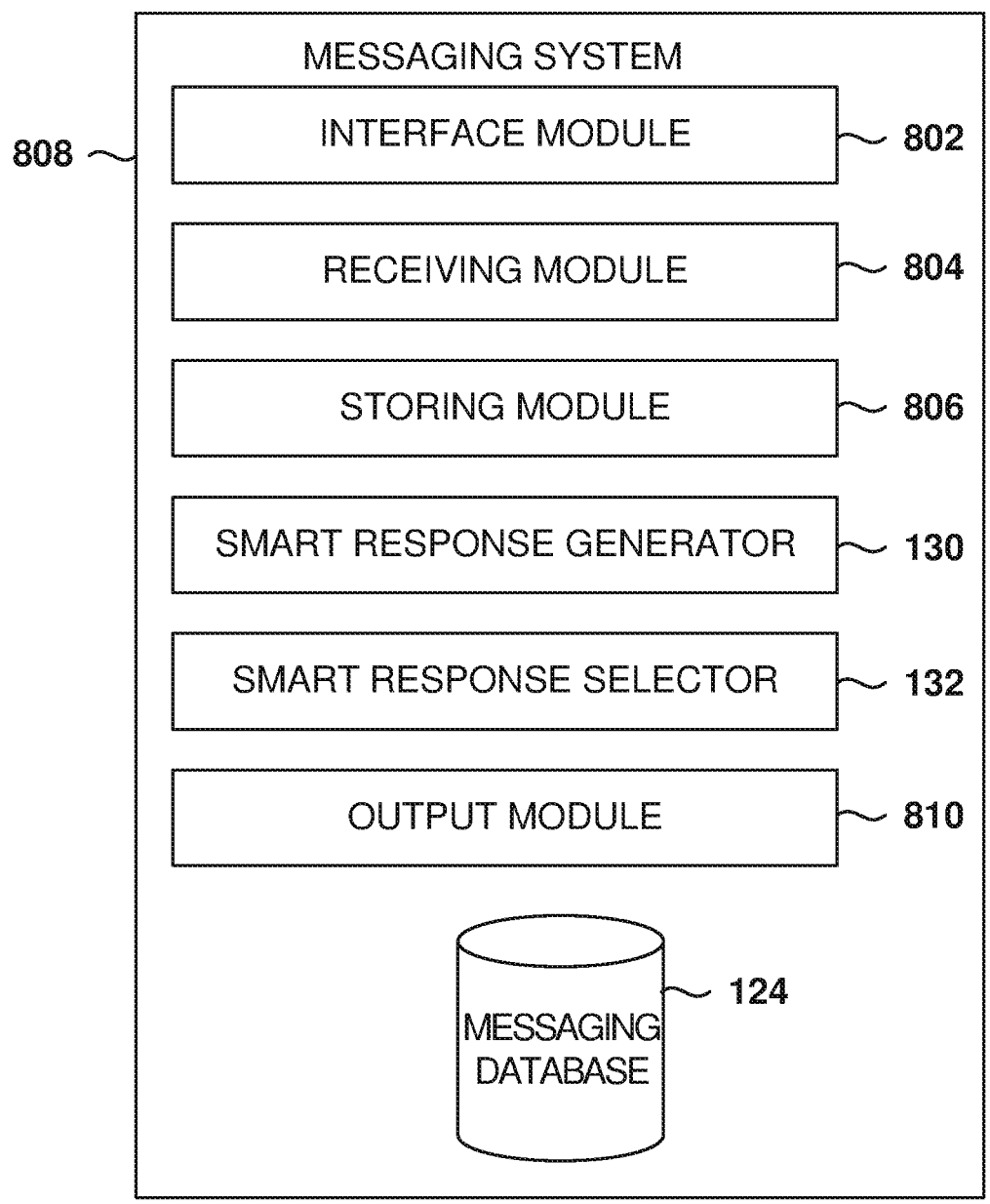
FIG. 8 shows the architecture of a messaging system, according to some example embodiments.

FIG. 8 shows a messaging system 808, according to some example embodiments. The various functional modules depicted in FIG. 8 may reside on a single computing device or may be distributed across several computing devices in various arrangements such as those used in cloud-based architectures.

The messaging system 808 includes an interface module 802, a receiving module 804, a storing module 806, a smart response generator 130, a smart response selector 132, an output module 810, and a messaging database 124. The interface module 802 provides a messaging interface that enables users to initiate and participate in communication sessions with other users. For example, the messaging interface includes user interface elements (e.g., buttons, scrollbars, text fields, etc.) that enable a user to select users and draft messages to initiate and participate in a communication session. Further, the messaging interface presents the users with a listing of available contacts to include in a communication session. The messaging interface also presents the user with a listing of existing communication sessions, which a user can select from to read the previous messages transmitted as part of the communication session as well as to draft and send new messages as part of the communication session.

The receiving module 804 receives messages that are being transmitted as part of a communication session. The messages are received from the client device of an originating user and intended for one or more other client devices of recipient users in the communication session.

The storing module 806 stores message data consisting of the received messages along with associated metadata in the messaging database 124. The storing module 806 may store the message data in the messaging database 124. In some embodiments, the storing module 806 anonymizes the message data to protect the privacy of the users. For example, the storing module 806 removes names and other personal information from the message data. The storing module 806 may also store the message data for a limited period of time, after which the message data is deleted. In some embodiments, a user is allowed to opt in or opt out of having their message data stored by the storing module 806. Accordingly, users that do not want to have their message data stored can opt out, resulting in the storing module 806 not storing their message data The smart response generator 130 generates recommended responses based on a received message and the historical message data. The smart response generator 130 uses the historical message data to generate a statistical model, such as a shallow embedding model, which is used to determine recommended responses based on a received message. For example, upon receiving a message from a client device, the smart response generator 130 uses the received message as input in the statistical model, which results in a set of candidate responses to the message.

The smart response selector 132 selects a set of recommended responses from the set of candidate responses, which can be provided to a user. For example, the smart response selector 132 may utilize the method 500 described above with reference to FIG. 5.

The output module 810 transmits received messages and a set of recommended responses to a recipient user's client device as part of a communication session. The recipient user can select a recommended response to quickly and easily respond to the received message.

Figure 9:
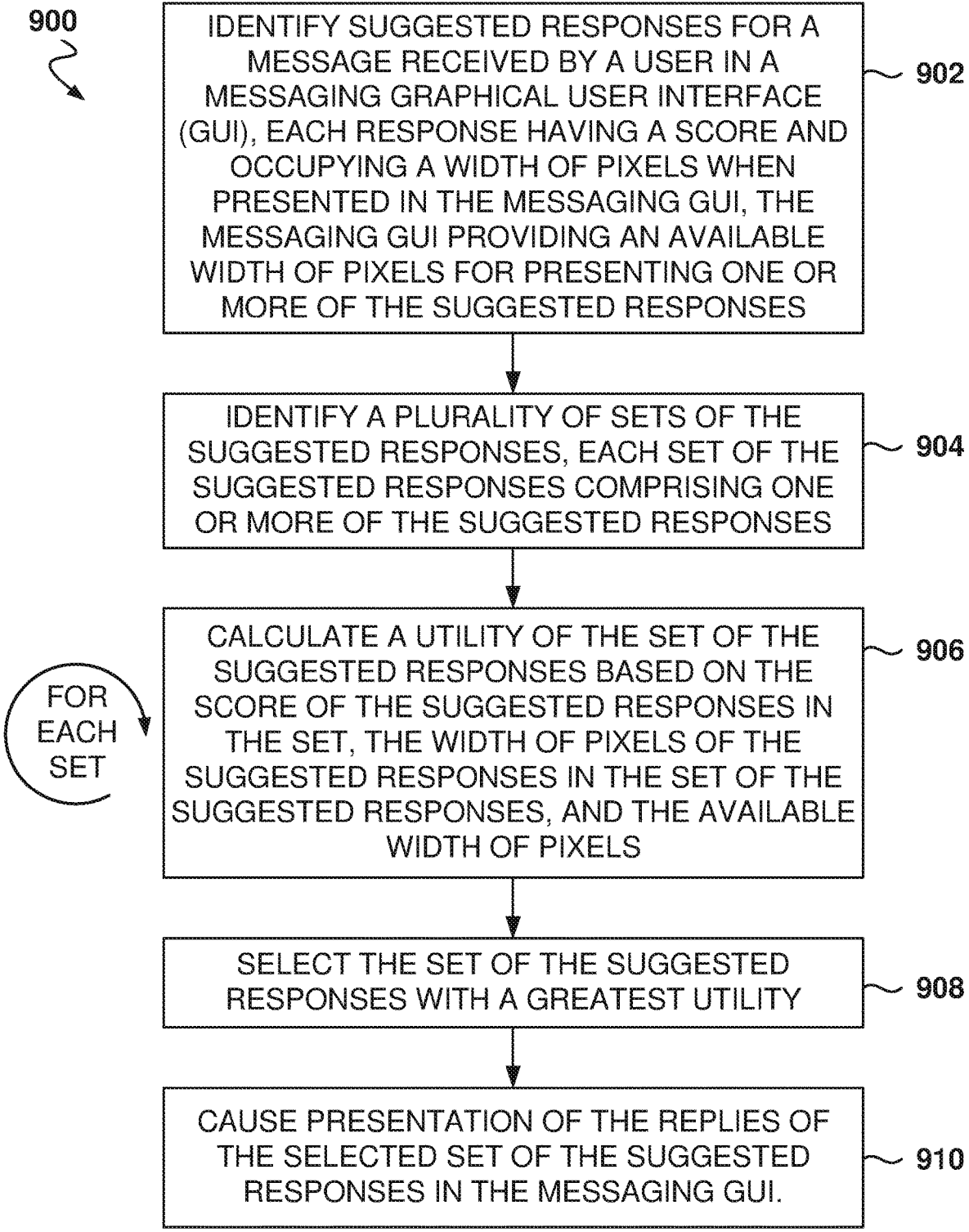
FIG. 9 is a flowchart of a method for selecting response suggestions, in a messaging GUI, that provide maximum utility for the user, according to some example embodiments.

FIG. 9 is a flowchart of a method 900 for selecting response suggestions, in a messaging GUI, that provide maximum utility for the user, according to some example embodiments. While the various operations in this flowchart are presented and described sequentially, one of ordinary skill will appreciate that some or all of the operations may be executed in a different order, be combined or omitted, or be executed in parallel.

At operation 902, one or more processors identify a set of suggested responses for a message received by a user in a messaging graphical user interface (GUI). Each suggested response has a score and occupies a width of pixels when presented in the messaging GUI, where the messaging GUI provides an available width of pixels for presenting one or more of the suggested responses.

From operation 902, the method 900 flows to operation 904 for identifying, by the one or more processors, a plurality of sets of the suggested responses. Each set of the suggested responses comprises one or more of the suggested responses.

Operation 906 is performed, for each set of the suggested responses, to calculate, by the one or more processors, a utility of the set of the suggested responses based on the score of the suggested responses in the set, the width of pixels of the suggested responses in the set of the suggested responses, and the available width of pixels.

From operation 906, the method 900 flows to operation 908, where the one or more processors select the set of the suggested responses with the greatest utility. Operation 910 is for causing presentation of the responses of the selected set of the suggested responses in the messaging GUI.

In one example, calculating the utility of the set of the suggested responses is further based on a space between the suggested responses of the set when presented in the messaging GUI.

In one example, calculating the utility of the set of the suggested responses further comprises performing a check to determine if the suggested responses overflow the available width of pixels, and calculating an overflow penalty for the utility of the set of suggested responses based on the overflow.

In one example, the overflow penalty is equal to a penalty factor times a size in pixels of the overflow.

In one example, calculating the utility of the set of the suggested responses further comprises setting the utility as a sum of the scores of the suggested responses in the set of the suggested responses minus the overflow penalty.

In one example, calculating the utility and selecting the set of the suggested responses includes utilizing mixed integer linear programming.

In one example, the mixed integer linear programming includes a constraint where a sum of the widths of the suggested responses in the set plus width of spaces between the suggested responses is less than or equal to the available width of pixels plus a width of the overflow in pixels.

In one example, calculating the utility of the set of the suggested responses further comprises calculating a diversity of the suggested responses in the set.

In one example, the utility of the set of the suggested responses is calculated based on the diversity.

In one example, causing presentation of the responses of the selected set further comprises presenting the suggested responses in the messaging GUI, detecting a selection from one of the set of the suggested responses, and transmitting the selected suggested response.

Another embodiment is for a system that includes a memory comprising instructions and one or more computer processors. The instructions, when executed by the one or more computer processors, cause the one or more computer processors to perform operations comprising: identifying a set of suggested responses for a message received by a user in a messaging graphical user interface (GUI), each suggested response having a score and occupying a width of pixels when presented in the messaging GUI, the messaging GUI providing an available width of pixels for presenting one or more of the suggested responses; identifying a plurality of sets of the suggested responses, each set of the suggested responses comprising one or more of the suggested responses; for each set of the suggested responses, calculating a utility of the set of the suggested responses based on the score of the suggested responses in the set, the width of pixels of the suggested responses in the set of the suggested responses, and the available width of pixels; selecting the set of the suggested responses with a greatest utility; and causing presentation of the responses of the selected set of the suggested responses in the messaging GUI.

In yet another embodiment, a machine-readable storage medium (e.g., a non-transitory storage medium) includes instructions that, when executed by a machine, cause the machine to perform operations comprising: identifying a set of suggested responses for a message received by a user in a messaging graphical user interface (GUI), each suggested response having a score and occupying a width of pixels when presented in the messaging GUI, the messaging GUI providing an available width of pixels for presenting one or more of the suggested responses; identifying a plurality of sets of the suggested responses, each set of the suggested responses comprising one or more of the suggested responses; for each set of the suggested responses, calculating a utility of the set of the suggested responses based on the score of the suggested responses in the set, the width of pixels of the suggested responses in the set of the suggested responses, and the available width of pixels; selecting the set of the suggested responses with a greatest utility; and causing presentation of the responses of the selected set of the suggested responses in the messaging GUI.

Figure 10:
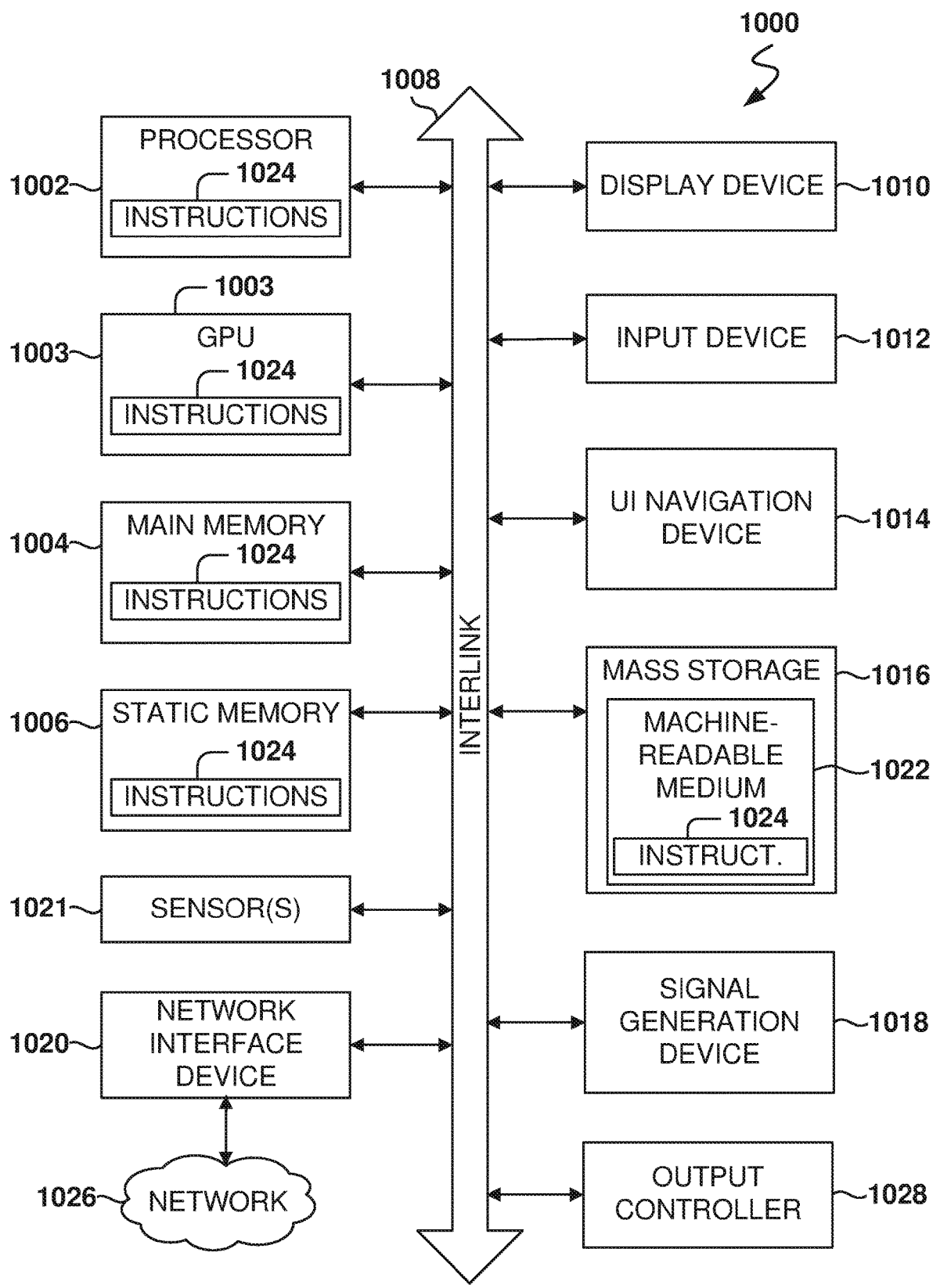
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines 1000 that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media 1022.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium 1022 examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
identifying, by one or more processors, suggested responses for a message received by a user in a messaging graphical user interface (GUI), each suggested response having a score and occupying a width of pixels when presented in the messaging GUI, the messaging GUI providing an available width of pixels for presenting one or more of the suggested responses;
identifying, by the one or more processors, a plurality of sets of the suggested responses, each set of the suggested responses comprising one or more of the suggested responses;
for each set of the suggested responses, calculating, by the one or more processors, a utility of the set of the suggested responses based on the score of the suggested responses in the set, the width of pixels of the suggested responses in the set of the suggested responses, and the available width of pixels, wherein calculating the utility of the set of the suggested responses further comprises:
performing a check to determine if the suggested responses overflow the available width of pixels; and
calculating an overflow penalty for the utility of the set of suggested responses based on the overflow;
selecting, by the one or more processors, the set of the suggested responses with a greatest utility; and
causing presentation of the responses of the selected set of the suggested responses in the messaging GUI.

2. The method as recited in claim 1, wherein calculating the utility of the set of the suggested responses is further based on a space between the suggested responses of the set when presented in the messaging GUI.

3. The method as recited in claim 1, wherein the overflow penalty is equal to a penalty factor times a size in pixels of the overflow.

4. The method as recited in claim 1, wherein calculating the utility of the set of the suggested responses further comprises:
setting the utility as a sum of the scores of the suggested responses in the set of the suggested responses minus the overflow penalty.

5. The method as recited in claim 1, wherein calculating the utility and selecting the set of the suggested responses includes utilizing mixed integer linear programming.

6. The method as recited in claim 5, wherein the mixed integer linear programming includes a constraint where a sum of the widths of pixels of the suggested responses in the set plus width of spaces between the suggested responses is less than or equal to the available width of pixels plus a width of overflow in pixels.

7. The method as recited in claim 1, wherein calculating the utility of the set of the suggested responses further comprises:
calculating a diversity of the suggested responses in the set.

8. The method as recited in claim 7, wherein the utility of the set of the suggested responses is calculated based on the diversity.

9. The method as recited in claim 1, wherein causing presentation of the responses of the selected set further comprises:
presenting the suggested responses in the messaging GUI;
detecting a selection from one of the set of the suggested responses; and
transmitting the selected suggested response.

10. A system comprising:
a memory comprising instructions; and
one or more computer processors, wherein the instructions, when executed by the one or more computer processors, cause the one or more computer processors to perform operations comprising:
identifying suggested responses for a message received by a user in a messaging graphical user interface (GUI), each suggested response having a score and occupying a width of pixels when presented in the messaging GUI, the messaging GUI providing an available width of pixels for presenting one or more of the suggested responses;
identifying a plurality of sets of the suggested responses, each set of the suggested responses comprising one or more of the suggested responses;
for each set of the suggested responses, calculating a utility of the set of the suggested responses based on the score of the suggested responses in the set, the width of pixels of the suggested responses in the set of the suggested responses, and the available width of pixels, wherein calculating the utility of the set of the suggested responses further comprises:
performing a check to determine if the suggested responses overflow the available width of pixels; and
calculating an overflow penalty for the utility of the set of suggested responses based on the overflow;
selecting the set of the suggested responses with a greatest utility; and
causing presentation of the responses of the selected set of the suggested responses in the messaging GUI.

11. The system as recited in claim 10, wherein calculating the utility of the set of the suggested responses is further based on a space between the suggested responses of the set when presented in the messaging GUI.

12. The system as recited in claim 10, wherein the overflow penalty is equal to a penalty factor times a size in pixels of the overflow.

13. The system as recited in claim 10, wherein calculating the utility of the set of the suggested responses further comprises:
setting the utility as a sum of the scores of the suggested responses in the set of the suggested responses minus the overflow penalty.

14. A non-transitory machine-readable storage medium including instructions that, when executed by a machine, cause the machine to perform operations comprising:
identifying suggested responses for a message received by a user in a messaging graphical user interface (GUI), each suggested response having a score and occupying a width of pixels when presented in the messaging GUI, the messaging GUI providing an available width of pixels for presenting one or more of the suggested responses;

identifying a plurality of sets of the suggested responses, each set of the suggested responses comprising one or more of the suggested responses;

for each set of the suggested responses, calculating a utility of the set of the suggested responses based on the score of the suggested responses in the set, the width of pixels of the suggested responses in the set of the suggested responses, and the available width of pixels, wherein calculating the utility of the set of the suggested responses further comprises:

performing a check to determine if the suggested responses overflow the available width of pixels; and, calculating an overflow penalty for the utility of the set of the suggested responses based on the overflow:

selecting the set of the suggested responses with a greatest utility; and causing presentation of the responses of the selected set of the suggested responses in the messaging GUI.

15. The non-transitory machine-readable storage medium as recited in claim 14, wherein calculating the utility of the set of the suggested responses is further based on a space between the suggested responses of the set when presented in the messaging GUI.

16. The non-transitory machine-readable storage medium as recited in claim 14, wherein the overflow penalty is equal to a penalty factor times a size in pixels of the overflow.

17. The non-transitory machine-readable storage medium as recited in claim 14, wherein calculating the utility of the set of the suggested responses further comprises:

setting the utility as a sum of the scores of the suggested responses in the set of the suggested responses minus the overflow penalty.

\* \* \* \* \*

UNITED STATES PATENT AND TRADEMARK OFFICE
CERTIFICATE OF CORRECTION

PATENT NO. : 10,956,474 B2
APPLICATION NO. : 16/353397
DATED : March 23, 2021
INVENTOR(S) : Jeffrey William Pasternack It is certified that error appears in the above-identified patent and that said Letters Patent is hereby corrected as shown below:

In the Claims

In Column 17, Line 18, in Claim 14, delete "and," and insert --and-- therefor

In Column 17, Line 20, in Claim 14, delete "overflow:" and insert --overflow;-- therefor Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*